United States Patent
Kaibara

(10) Patent No.: US 6,954,280 B1
(45) Date of Patent: Oct. 11, 2005

(54) IMAGE COMMUNICATION METHOD, APPARATUS, AND SYSTEM

(75) Inventor: Hiroshi Kaibara, Kawasaki (JP)

(73) Assignee: Canon Kabushika Kaisha, Tokyo (JP)

( * ) Notice: Subject to any disclaimer, the term of this patent is extended or adjusted under 35 U.S.C. 154(b) by 0 days.

(21) Appl. No.: 09/415,668

(22) Filed: Oct. 12, 1999

(30) Foreign Application Priority Data

| Oct. 13, 1998 | (JP) | 10-290956 |
| Oct. 4, 1999 | (JP) | 11-283462 |
| Oct. 4, 1999 | (JP) | 11-283463 |

(51) Int. Cl.[7] .............................................. G06F 15/00
(52) U.S. Cl. ...................................... 358/1.15; 358/1.4
(58) Field of Search ............................... 358/1.15, 1.1, 358/442, 404, 444, 1.4, 506, 487, 1.16; 396/303, 429, 422, 544, 332; 701/1

(56) References Cited

U.S. PATENT DOCUMENTS

| 5,799,219 | A | * | 8/1998 | Moghadam et al. ........ 396/319 |
| 5,966,553 | A | * | 10/1999 | Nishitani et al. ........... 396/303 |
| 5,978,016 | A | * | 11/1999 | Luorette et al. .............. 348/64 |
| 6,092,023 | A | * | 7/2000 | Kunishige ...................... 702/1 |
| 6,104,886 | A | * | 8/2000 | Suzuki et al. ............... 396/429 |
| 6,195,513 | B1 | * | 2/2001 | Nihei et al. ................. 396/332 |
| 6,237,010 | B1 | * | 5/2001 | Hui et al. .................... 707/502 |
| 6,426,801 | B1 | * | 7/2002 | Reed ......................... 358/1.16 |

FOREIGN PATENT DOCUMENTS

| JP | 7-283930 | 10/1995 |
| JP | 9-55825 | 2/1997 |
| JP | 9-055825 | 2/1997 |
| JP | 10-341364 | 12/1998 |

* cited by examiner

*Primary Examiner*—Mark Wallerson
(74) *Attorney, Agent, or Firm*—Morgan & Finnegan, L.L.P.

(57) ABSTRACT

Proposed is a method of displaying a transmission log such that it can be easily recognized. Images are transmitted to an external device. A list holding information representing the transmitted images and information representing the transmission order of the images is generated. On the basis of the information held in this list, the transmitted images and order are displayed.

23 Claims, 15 Drawing Sheets

FIG. 14

```
CONNECT 57600

★★★ CONNECTION IS STARTED ★★★
PowerShot Series...
PowerShot SERIES IS CONFIRMED. START RECEPTION
DATE : 98/06/09  TIME : 16 : 25 : 19
NOTE : Accident10.25

DOWNLOAD c : ¥dc97¥ctg92597¥aut29864jpg  AS  19980609162521jpg
DOWNLOAD FILE NUMBER 001

DOWNLOAD c : ¥dc97¥ctg92597¥aut29865jpg  AS  19980609162535jpg
DOWNLOAD FILE NUMBER 002

DOWNLOAD c : ¥dc97¥ctg92597¥aut29866jpg  AS  19980609162548jpg
DOWNLOAD FILE NUMBER 003

★★★  END OF FILE TRANSFER  ★★★
```

IMAGE COMMUNICATION METHOD, APPARATUS, AND SYSTEM

BACKGROUND OF THE INVENTION

The present invention relates to an image communication apparatus and image communication result confirmation method and, more particularly, to a method of confirming the result of image communication by an image communication apparatus.

As one of means for confirming or proving that a transmitting side has transmitted a plurality of images, a transmission log may be stored. A normal communication log stores, in a file, the reception start date and time, transmission source, and reception file information in a text format. FIG. 14 shows a reception log of a personal computer.

However, in a device such as a camera having only a small display, it is hard to confirm a text as the contents of a log.

In a normal communication log, when image transmission has failed, file information of successful communication and file information of communication error are stored in mixture. For this reason, to confirm the file of communication error, the file information of communication error must be selected from the communication log having both of the file information of successful communication and the file information of communication error, resulting in cumbersome confirmation.

SUMMARY OF THE INVENTION

The present invention has been made in consideration of the above situation, and has as its first object to provide an image transmission apparatus and method realizing easy confirmation of a transmitted image, and more specifically, to provide a method of storing transmission and reception logs in an image transmission apparatus such as a digital camera, and a method of browsing the logs.

It is a second object of the present invention to efficiently perform desired processing after the abnormal end of image transmission when image transmission is abnormally ended.

According to the present invention, the foregoing first object is attained by providing an image communication method comprising: a transmission step of transmitting images to an external device; a first list generation step of generating a list holding information representing the transmitted images and information representing a transmission order of the images; and an output step of outputting the transmitted images and the order to an output device on the basis of the information held in the list.

The foregoing first object is also attained by providing an image communication method comprising: the reception step of receiving images from an external device; a list generation step of generating a list holding information representing the received images and information representing a reception order of the images; and an output step of outputting the received images and the order to an output device on the basis of the information held in the list.

Further, the foregoing first object is also attained by providing an image communication apparatus comprising: transmission means for transmitting images to an external device; first list generation means for generating a list holding information representing the transmitted images and information representing a transmission order of the images; and control means for outputting the transmitted images and the order to output means on the basis of the information held in the list.

Furthermore, the foregoing first object is also attained by providing an image communication apparatus comprising: reception means for receiving images from an external device; list generation means for generating a list holding information representing the received images and information representing a reception order of the images; and output means for outputting the received images and the order on the basis of the information held in the list.

Further, the foregoing first object is also attained by providing an image communication system having a plurality of image communication apparatuses for transmitting/receiving image data, wherein a transmitting-side image communication apparatus comprises: transmission means for transmitting images to a receiving-side image communication apparatus; and first list generation means for generating a list holding information representing the transmitted images and information representing a transmission order of the images, and a receiving-side image communication apparatus comprises: reception means for receiving the images from the transmitting-side image communication apparatus; and second list generation means for generating a list holding information representing the received images and information representing a reception order of the images.

According to the above arrangements, since transmitted or received image/images are output on the basis of a log file, the contents of the log file can be easily recognized.

According to the present invention, the foregoing second object is attained by providing an image communication method characterized by comprising: a first list generation step of generating a list holding images representing images to be transmitted and information representing a transmission order of the Images; a transmission step of transmitting the images to an external device on the basis of the list generated in the first list generation step; a second list generation step of generating a list holding information representing the images transmitted in the transmission step and information representing the transmission order of the images; and a third list generation step of generating a list holding information of images which are not transmitted in the images to be transmitted, on the basis of the lists generated in the first and second list generation steps.

The foregoing second object is attained by providing an image communication apparatus comprising: first list generation means for generating a list holding images representing images to be transmitted and information representing a transmission order of the images; transmission means for transmitting the images to an external device on the basis of the list generated by the first list generation means; second list generation means for generating a list holding information representing the images transmitted by the transmission means and information representing the transmission order of the images; and third list generation means for generating a list holding information of images which are not transmitted in the images to be transmitted, on the basis of the lists generated by the first and second list generation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a view showing a reception log for a personal computer (PC).

DETAILED DESCRIPTION OF THE PREFERRED EMBODIMENTS

Preferred embodiments of the present invention will be described in detail in accordance with the accompanying drawings.

Figure 1:
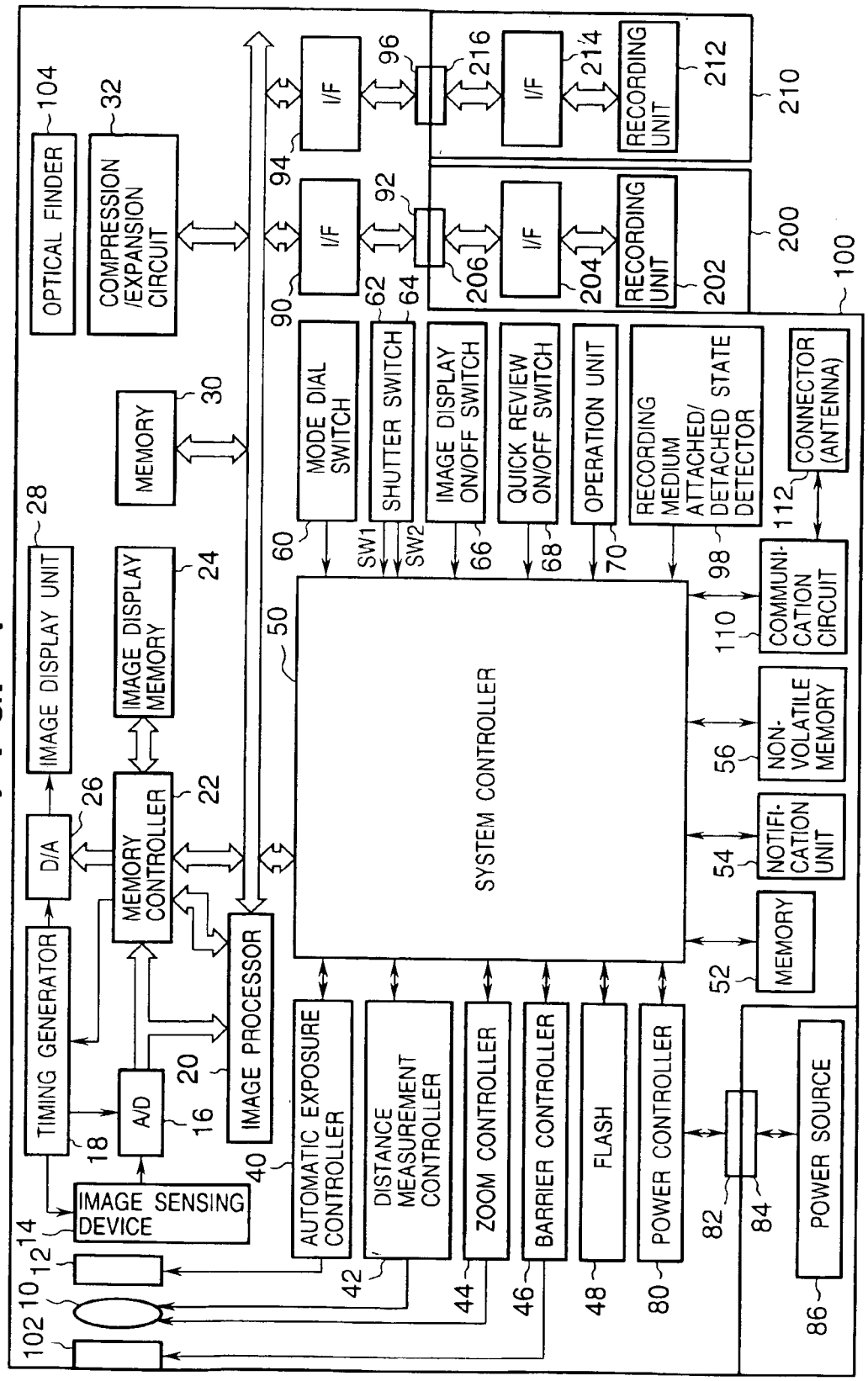
FIG. 1 is a block diagram showing the arrangement of an image sensing apparatus according to a first embodiment of the present invention.

FIG. 1 is a block diagram showing a configuration of an image sensing apparatus according to the first embodiment of the present invention. In FIG. 1, reference numeral 100 denotes an image sensing apparatus such as a digital camera. In the image sensing apparatus 100, 10 denotes an image sensing lens; 12, a shutter having a diaphragm function; 14, an image sensing device which converts an optical image into an electric signal; 16, an A/D converter which converts an analog signal output from the image sensing device 14 into a digital signal_ 18, a timing generator which supplies a clock signal and a control signal respectively to the A/D converter 16 and a D/A converter 26, under the control of a memory controller 22 and a system controller 50. Numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing with respect to an exposure controller 40 and a distance measurement controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Numeral 28 denotes an image display unit comprising an LCD or the like. Image data written into the image display memory 24 is displayed on the image display unit 28 via the D/A converter 26. An electronic finder function is realized by sequentially display obtained images on the image display unit 28. Further, image display unit 28 arbitrarily turns ON/OFF its display, in accordance with an instruction from the system controller 50. If the display is turned OFF, the electric consumption of the image processing apparatus 100 can be greatly reduced.

The memory 30, used for storing obtained still images and moving images, has a sufficient storage capacity for storing a predetermined number of still images and a moving image for a predetermined period. In sequential image sensing to sequentially obtain a plural number of still images or panoramic images sensing, a large amount of image data can be written into the memory 30 at a high speed. Further, the memory 30 may be used as a work area for the system controller 50.

The compression/expansion circuit 32 compresses or expands image data by adaptive discrete cosine transformation (ADCT) or the like. The compression/expansion circuit 32 reads image data stored in the memory 30 and performs compression or expansion processing on the read image data, and writes the processed data into the memory 30.

The exposure controller 40 controls the shutter 12 having the diaphragm function. The exposure controller 40 interlocked with a flash 48 also has a flash adjusting function. The distance measurement controller 42 controls focusing of the image sensing lens 10. Numeral 44 denotes a zoom controller which controls zooming of the image sensing lens 10. Numeral 46 denote a barrier controller which controls the operation of a barrier 102 to protect the lens. The flash 48 has an AF auxiliary light projection function and a flash adjusting function.

The system controller 50 controls the exposure controller 40 and the distance measurement controller 42 by the TTL method, in accordance with the result of calculations by the image processor 20 based on the image data from the A/D converter 16.

The system controller 50 controls the overall image sensing apparatus 100. Memory 52 stores the constants, variables, and programs for operation of the system controller 50.

Numeral 54 denotes a notification unit which notifies operating statuses, messages and the like to the outside by using characters, images, sound and the like, in correspondence with execution of program by the system controller 50. The notification unit 54 comprises one or more combinations of display devices including an LCD and an LED for visual notification and sound generating devices for audio notification. Especially, the display device or devices is/are provided in a single or plural visually recognizable positions around an operation unit 70 of the image processing apparatus 100. Further, a part of functions of the notification unit 54 is provided within an optical finder 104. To perform the visual notification, an instruction from the system controller 50 is transmitted to the subsystem controller 52 by communication, and the subsystem controller 52 controls the display device or devices in accordance with the instruction.

The display contents of the notification unit 54, displayed on the LCD or the like, include indication of single shot/sequential image sensing, a self timer, a compression rate, the number of recording pixels, the number of recorded images, the number of recordable images, a shutter speed, an f number (aperture), exposure compensation, flash illumination, pink-eye effect mitigation, macro image sensing, a buzzer-set state, a timer battery level, a battery level, an error state, information of plural digit numbers, attached/detached status of recording media 200 and 210, operation of communication I/F, and date and time.

Further, the display contents of the notification unit 54, displayed within the optical finder 104, include a focus state, a camera shake warning, a flash charge state, the shutter speed, the fnumber (aperture), and the exposure compensation.

Numeral 56 denotes an electrically erasable and recordable nonvolatile memory such as an EEPROM.

Numerals 60, 62, 64 and 70 denote operation means for inputting various operation instructions to the system controller 50, comprising a single or plurality of combinations of switches, dials, touch panels, a device for pointing by line-of-sight detection, a voice recognition device, and the like. The subsystem controller 52 detects the operation content and transmits the content to the system controller 50 by communication.

Next, the operation means will be described in more detail.

Numeral 60 denotes a mode dial switch for selecting various function modes such as a power OFF mode, an automatic image sensing mode, an image sensing mode, a panoramic image sensing mode, a reproduction mode, a multi-image reproduction/deletion mode, and a PC connection mode.

Numeral 62 denotes a shutter switch SW1 turned ON by half stroke of a shutter button (not shown), to instruct start of the operations of the AF processing, the AE processing, the AWB processing, the EF processing and the like.

Numeral 64 denotes a shutter switch SW2 turned ON by full stroke of the shutter button (not shown), to instruct start of a series of operations of exposure processing to write a signal read from the image sensing device 14 into the memory 30, via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium 200 or 210.

An image display ON/OFF switch 66 can set ON/OFF of the image display unit 28. With this function, in image sensing using the optical finder 104, power supply to the image display unit 28 comprising an LCD or the like can be cut to save the power.

A quick review ON/OFF switch 68 sets the quick review function of automatically reproducing sensed image data immediately after image sensing. In this embodiment, especially, the switch 68 has a function of setting the quick review function in the OFF state of the image display unit 28.

Numeral 70 denotes an operation unit comprising various buttons and touch panels including a menu button, a set button, a macro/non-macro selection button, a multi-image reproduction/repaging button, a single-shot/sequential/self-timer image sensing selection button, a forward (+) menu item selection button, a backward (−) menu item selection button, a forward (+) reproduction image search button, a backward (−) reproduction image search button, an image sensing quality selection button, an exposure correction button, and a date/time set button.

Numeral 80 denotes a power controller comprising a battery detection circuit, a DC—DC converter, a switch circuit to select the block to be energized and the like. The power controller 80 detects the attached/detached state of the battery, the battery type and the remaining battery power level, controls the DC—DC converter based on the results of detection and an instruction from the system controller 50, and supplies a necessary voltage to the respective parts including the recording medium for the necessary period.

Numerals 82 and 84 denote connectors; and 86, the power source comprising a primary battery such as an alkaline battery or a lithium battery, a secondary battery such as an NiDd battery, an NiMH battery or an Li battery, an AC adapter, and the like.

Numerals 90 and 94 denote interfaces for recording media such as a memory card or a hard disk; and 92 and 96, connectors for connection with the recording media such as a memory card or a hard disk. A recording medium attached/detached state detector 98 detects whether recording medium 200 and/or 210 is attached to the connector 92 and/or connector 96.

In the present embodiment, two systems of interfaces and connectors for connection with the recording media are employed. However, the number of systems is not limited, and a single or plurality of systems interfaces and connectors may be provided. Further, interfaces and connectors pursuant to different standards may be combined.

As the interfaces and connectors, cards in conformity with Personal Computer Memory Card International Association standards (PCMCIA cards) and cards in conformity with compact flash (CF) card standards may be used.

In a case where cards and connectors in conformity with the PCMCIA standards, CF card standards and the like are used as the interfaces 90 and 94 and the connectors 92 and 96, image data and management information attached to the image data are transmitted/received with respect to other peripheral devices such as a computer and a printer by connection with various communication cards such as a LAN card, a modem card, a USB card, an IEEE 1394 card, a P1284 card, an SCSI card and a PHS card.

The barrier 102 covers the image sensing portion of the image sensing apparatus 100 including the lens 10, thus prevents dirt and breakage of the image sensing portion. This barrier 102 is open during image sensing. When image sensing is ended, the barrier is closed to protect the image sensing portion. Before operation of the barrier 102, the system controller 50 detects the position of each lens group to store the image sensing lens 10 in the camera. When it is determined that the image sensing lens 10 is extended, the image sensing lens 10 is retracted to the collapsible barrel position. At this time, the barrier 102 is closed in synchronism with retraction of the image sensing lens 10 to end the operation. In this embodiment, barrier control for the barrier 102 is driven by a barrier controller 46. However, the arrangement of the barrier 102 is not limited to this, and the barrier 102 may be mechanically driven in synchronism with drive of the image sensing lens 10.

The optical finder 104 can be used for image sensing without the electronic finder function by the image display unit 28. In the optical finder 104, realized are some of the functions of the notification unit 54 including the indication of focus state, the camera shake warning, the flash charge state, the shutter speed, the f number (aperture), the exposure compensation and the like.

The recording medium 200 comprises a memory card, a hard disk or the like. The recording medium 200 has a recording unit 202 of a semiconductor memory, a magnetic disk or the like, the interface 204 for communication with the image processing apparatus 100, and the connector 206 for connection with the image processing apparatus 100. Also, the recording medium 210 comprises a memory card, a hard disk or the like, and has a recording unit 212 of a semiconductor memory, a magnetic disk or the like, the interface 214 for communication with the image processing apparatus 100, and the connector 216 for connection with the image processing apparatus 100.

Figure 2A:
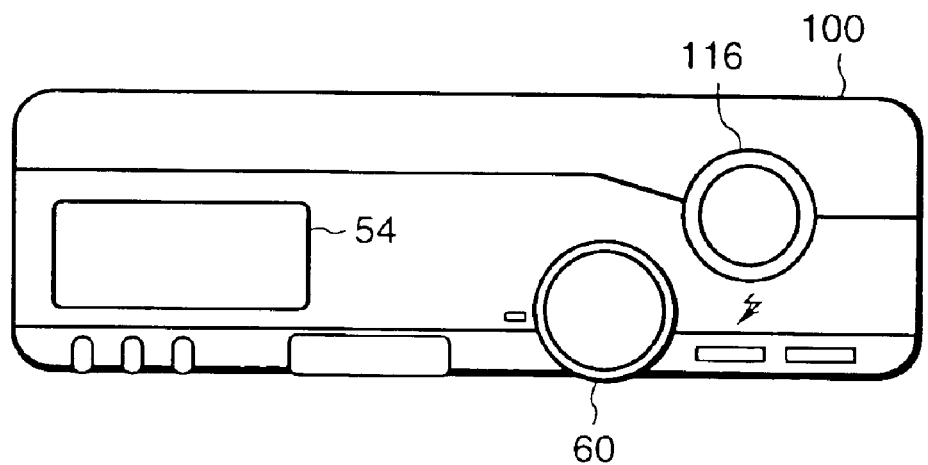
FIGS. 2A and 2B are views showing the outer appearance of a digital camera according to the first embodiment of the present invention.
Figure 2B:
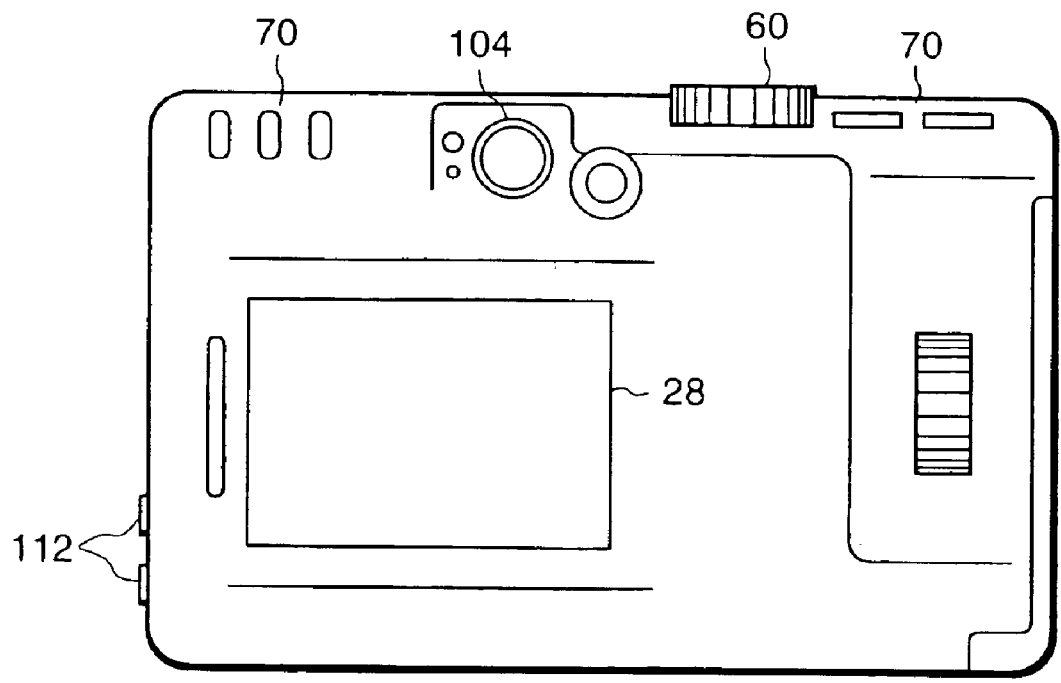

FIG. 2A is a top view of an electronic camera to which an image transmission/reception apparatus having a reproduction function is applied. FIG. 2B is a rear view of the electronic camera. The same reference numerals as in FIG. 1 denote the same parts in FIGS. 2A and 2B. Reference numeral 116 denotes a shutter button. An image sensed with the camera is displayed on the image display unit 28. The image display unit 28 normally uses an LCD (Liquid Crystal Display) and will be referred to as an LCD hereinafter. A window for inputting information for image editing or image transmission is also displayed on the LCD 28. For, e.g., a slide show in presentation, a monitor (not shown) such as a TV set may be connected to a connector 112 to externally output the image. A modem for image transmission/reception is connected to the connector 112 using a dedicated cable.

The operation unit 70 has, as operation buttons, a [MENU] button, [SET] button, [+] button, and [−] button. The operation buttons of the operation unit 70 are used in the following way.

The [MENU] button can be commonly used to select a menu for image reproduction and image recording. With this button, the menu is started, and in a menu layer including image operation, the menu is returned to the upper layer. The [SET] button can also be commonly used to select a menu for image reproduction and image recording. This button determines a menu item. The [+] button is used to switch the item selected from the menu to the next item or switch the selected image to the subsequent image. The [−] button is used to switch the item selected from the menu to the preceding item or switch the selected image to the immediately preceding image.

In, e.g., image reproduction, when the mode dial switch 60 is set in the normal reproduction mode, a single window is started. After that start, the latest image (with the largest file number) is displayed.

In single reproduction, an image is displayed in the full size of the LCD 28. If an image sensed with another camera has a different size, the image may have margins (block) without being displayed in the full window. After that, the [+] or [−] button is used to change the displayed image to the preceding or subsequent image. If the [+] button is pressed when the final (=latest) image is displayed, the first (=oldest) image is displayed. If the [−] button is pressed when the first (=oldest) image is displayed, the final (=latest) image is displayed.

Figure 3:
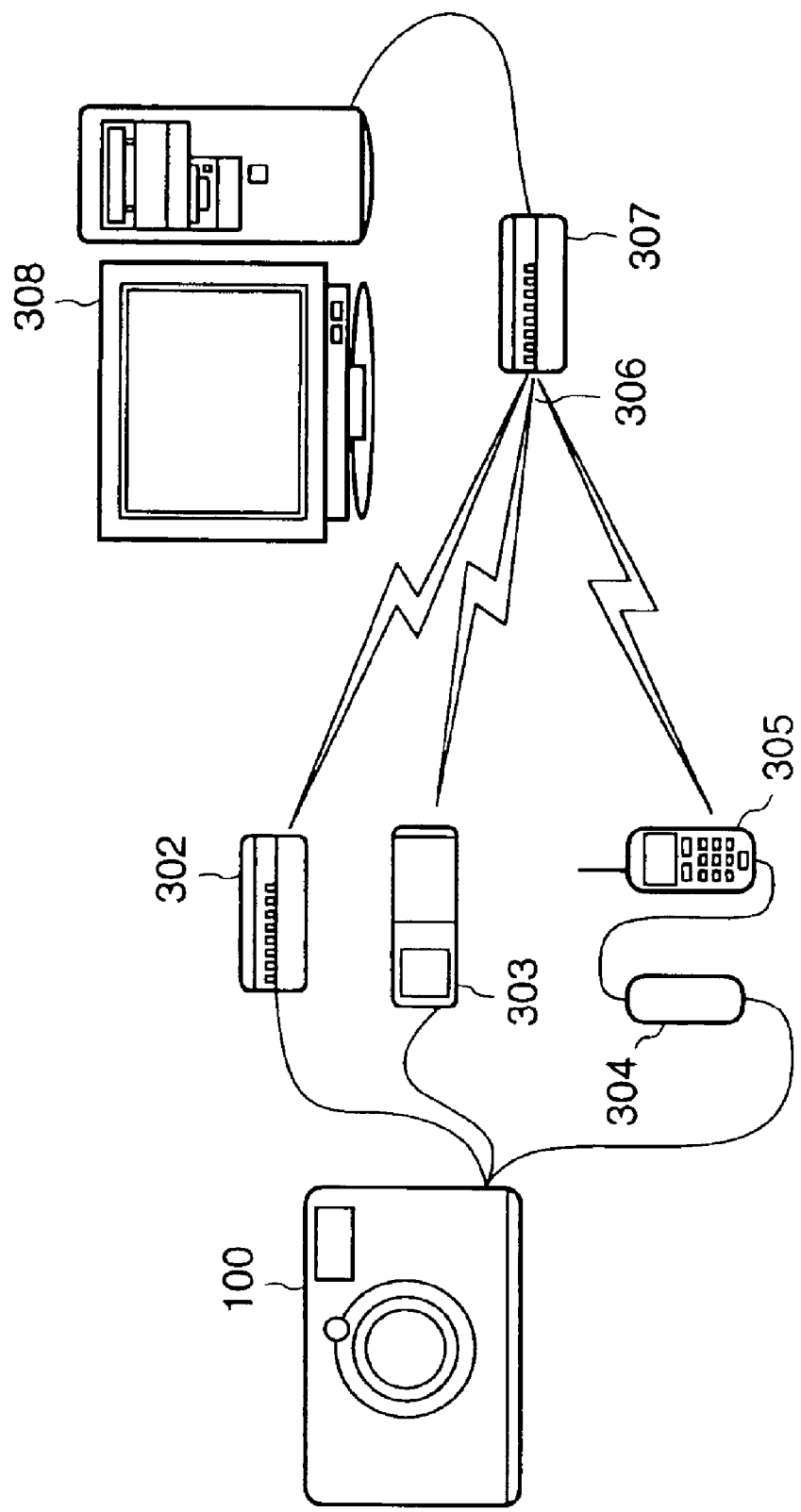
FIG. 3 is a view showing the configuration of an image sensing system according to the first embodiment of the present invention.

FIG. 3 is a view showing the configuration of the image sensing system according to the first embodiment.

The image sensing apparatus 100 such as a digital camera shown in FIG. 1 has an image transmission function. The image sensing apparatus 100 can input the telephone number of the other party, and user ID and password for verification, which are necessary for image transmission, using the image display unit 28 and operation unit 70. The image sensing apparatus 100 is connected to a modulation/demodulation unit 302 such as a FAX modem, terminal adapter 303, or portable telephone adapter 304 via the digital terminal 112 using a cable. A receiving-side device 308 such as a personal computer (PC) is connected to a FAX modem 307 via an RS-232C port.

The FAX modem 302, terminal adapter 303, or digital portable telephone 305 on the transmitting side and the FAX modem or terminal adapter on the receiving side are connected to each other through an analog or digital telephone line. In the first embodiment shown in FIG. 3, the system on the receiving side is connected to an analog telephone line. When the system on the receiving side is connected to a digital telephone line, the FAX modem 307 is replaced with a terminal adapter. A digital portable telephone may be connected.

An image sensed with the image sensing apparatus 100 can be transmitted to the PC 308 on the receiving side. The image sensing apparatus 100 must input necessary information such as the telephone number, user ID, and password. The baud rate (transfer rate) between the camera and the FAX modem, and the type of the connected modem must also be input. The image to be transmitted can be selected by the image sensing apparatus 100.

Figure 4:
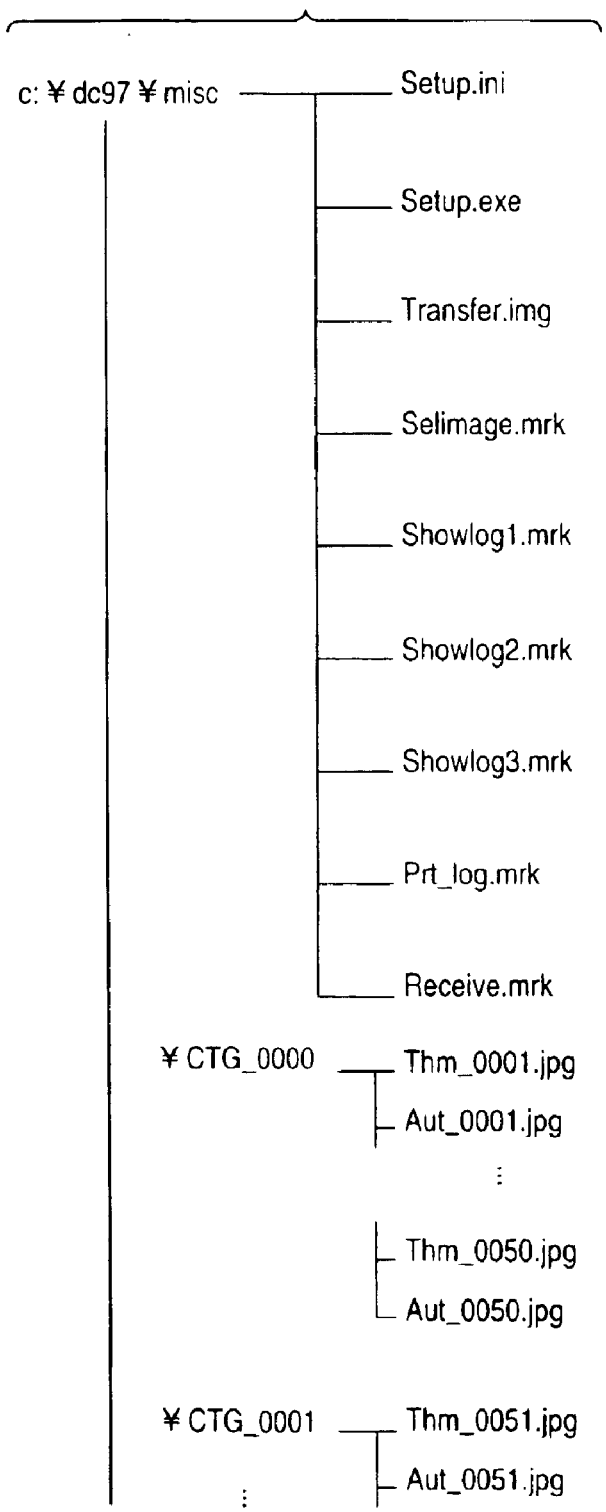
FIG. 4 is a view showing the directory structure of the first embodiment of the present invention.

FIG. 4 shows the directory structure of data recorded in a recording medium.

Referring to FIG. 4, CTG_XXXX (X represents a number) is a directory representing an image data file.

Aut_XXXX.jpg is compressed image data complying with JPEG (international standard). Thm_XXXX.jpg is a thumbnail image data file. Data from the image sensing device may be recorded without compression, and in such case, file names are Aut_XXXX.crw and Thm_XXXX.jpg in a CCDRAW data file. Aut_XXXX.jpg and Thm_XXXX.jpg are paired. Every time an image is sensed, a normal image (Aut_XXXX.jpg) and a thumbnail image (Thm_XXXX.jpg), which have the same four digits, are recorded on the recording medium and subjected to image reproduction or image transmission processing.

In this embodiment, for example, CTG_XXXX can store 9,999 files, and 50 Aut_XXXX.jpg files and 50 Thm_XXXX.jpg (or .crw) files can be stored in correspondence with each CTG_XXXX.

In addition, misc is a directory representing a file for installing an expansion function such as transmission log generation and confirmation and image transmission. This directory is used in the first embodiment. A file (Transfer.img) representing a program for selecting and transmitting an image is also stored in this directory. Data for automatic file transmission are stored as lower files. Files necessary for installing the transmission program are also stored in this directory.

Selimage.mrk is a file (mark file) representing files to be transmitted and the transmission order of the files.

Showlog1.mrk to Showlog3.mrk are transmission log files Showlog1 to Showlog3 (file names) for confirming the image transmission states. Prt_log.mrk is a file Printlog (file name) representing the automatic printing order for confirming the transmitted files.

When 100 images can be stored in *.mrk, 100 files can be selected as files to be transmitted.

Receive.mrk is a file generated when the image sensing apparatus 100 has an image reception function. This will be described later in detail.

The operation of the image sensing apparatus 100 with the above arrangement will be described next with reference to FIGS. 5 to 9.

Figure 5:
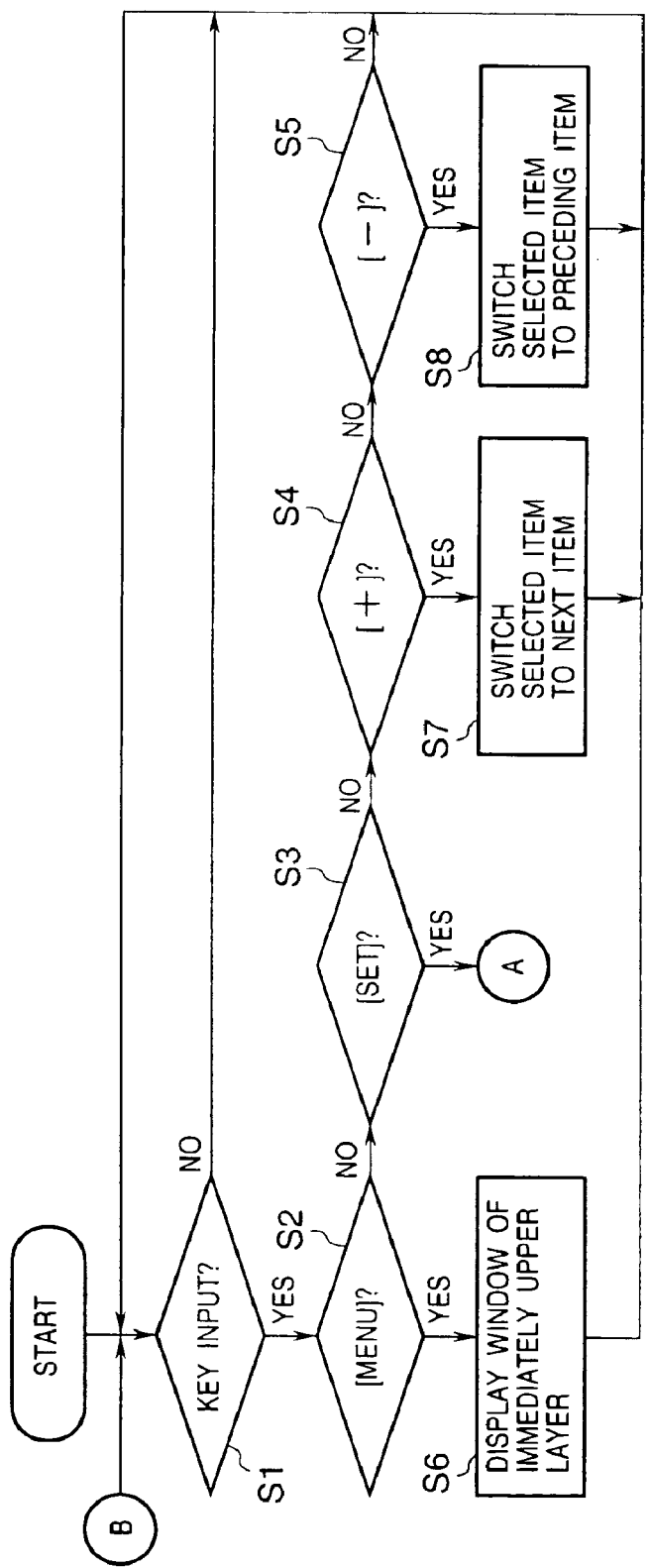
FIG. 5 is a flowchart showing the operation of the image sensing apparatus according to the first embodiment of the present invention.
Figure 6:
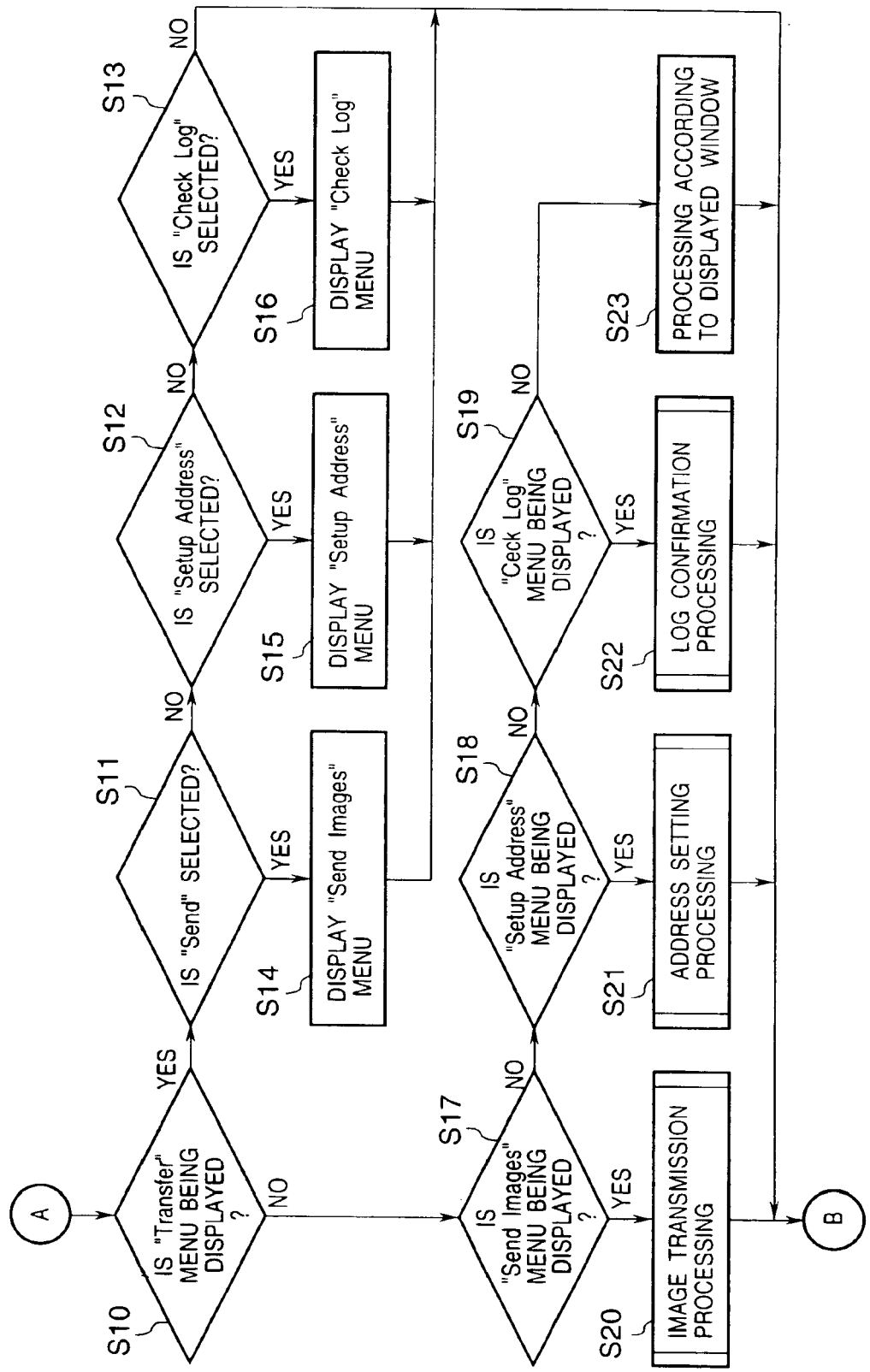
FIG. 6 is a flowchart showing the operation of a transfer program in the first embodiment of the present invention.
Figure 7:
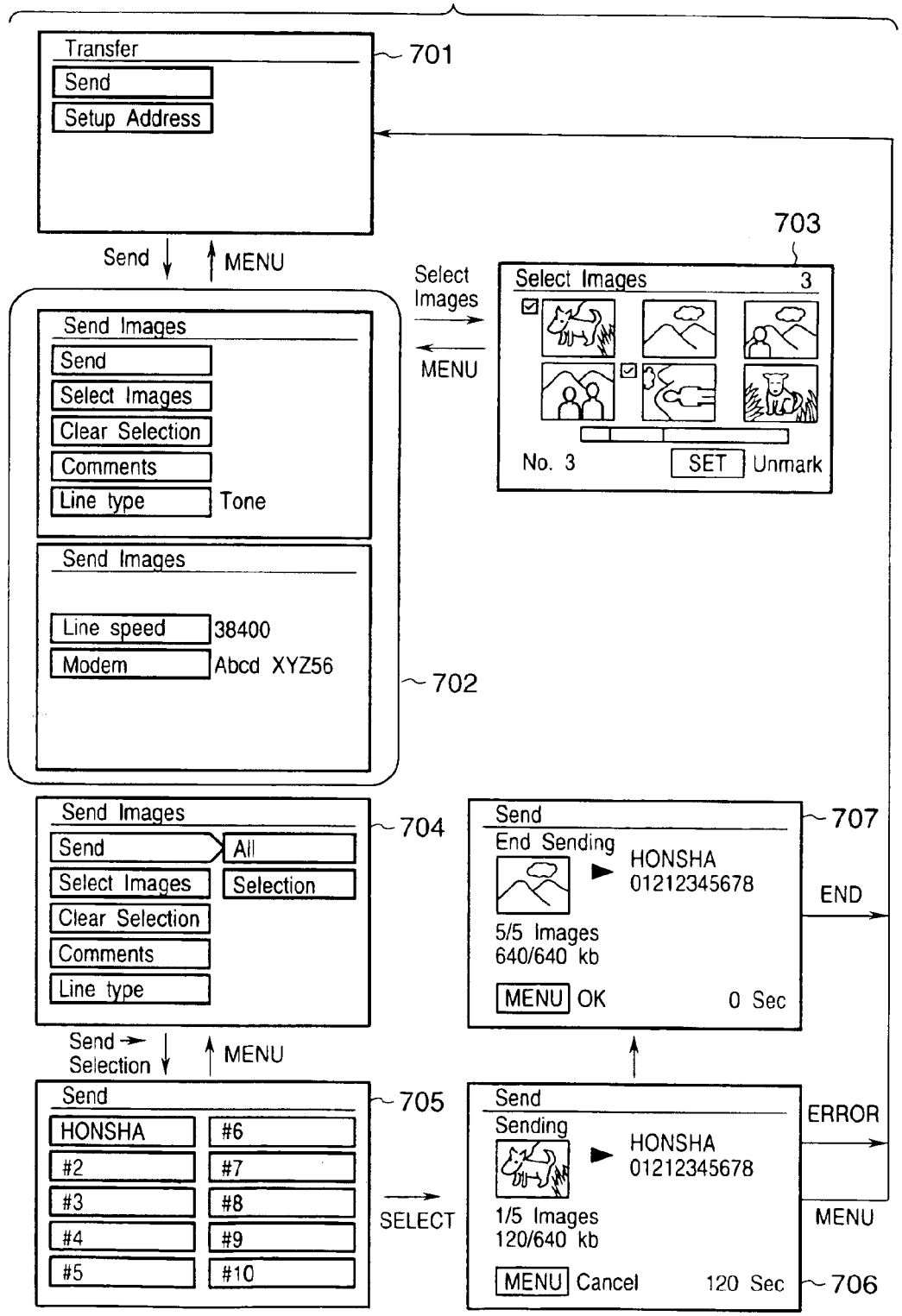
FIG. 7 is a view showing the transition of a UI window in image transmission in the first embodiment of the present invention.
Figure 8:
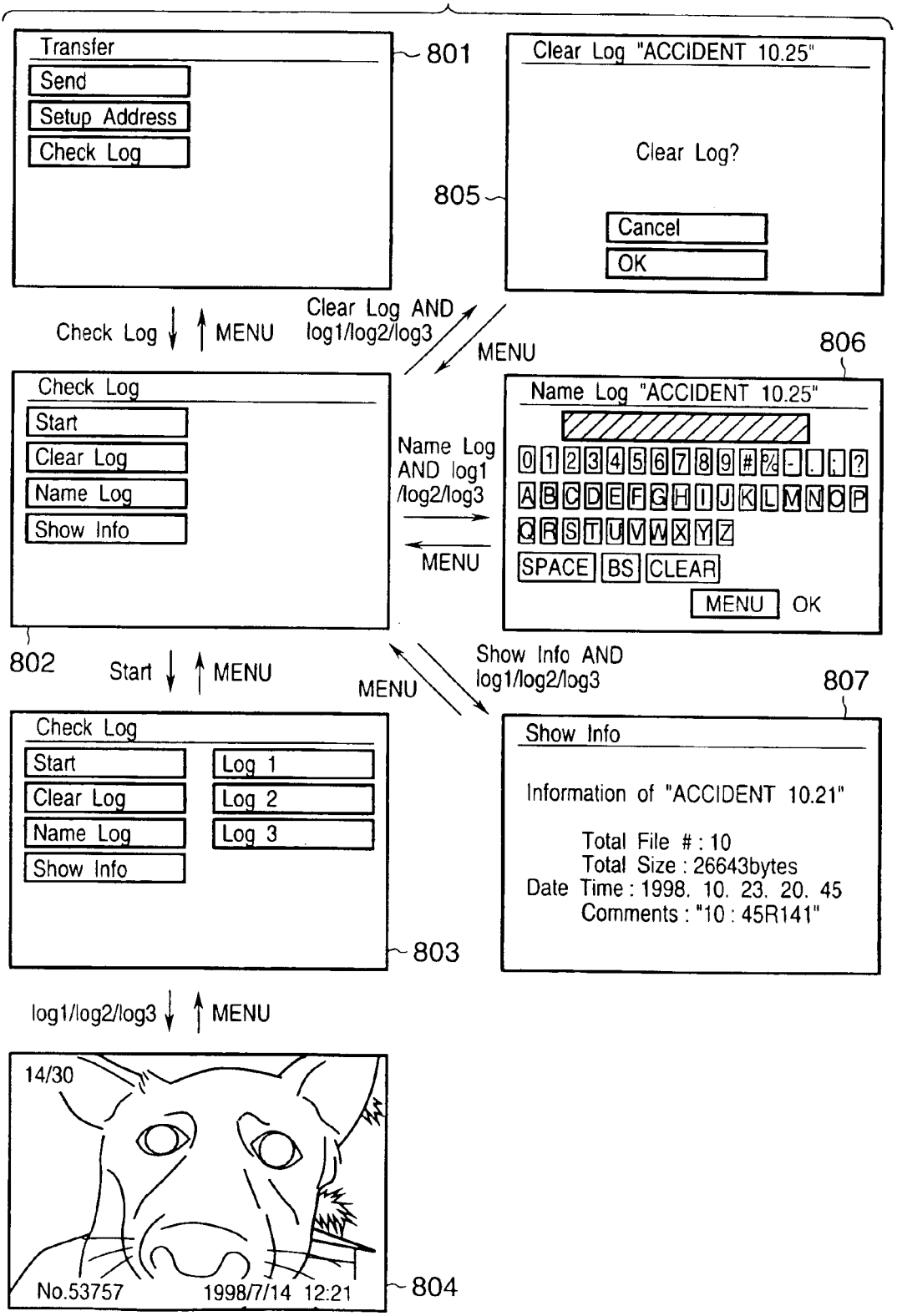
FIG. 8 is a view showing the transition of the UI window in transmission log confirmation in the first embodiment of the present invention.
Figure 9:
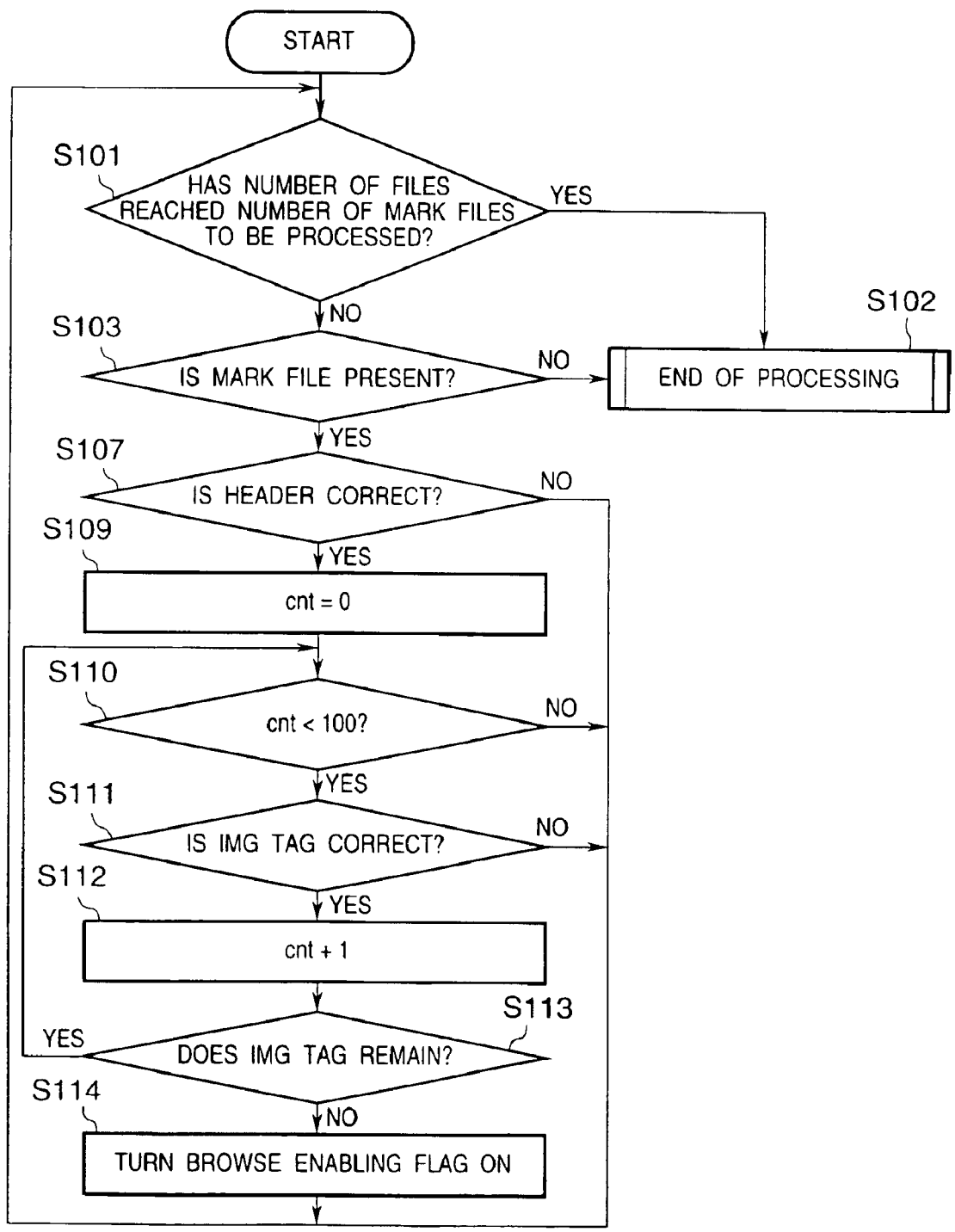
FIG. 9 is a flowchart showing the transmission log confirmation operation in the first embodiment of the present invention.

FIG. 5 is a flowchart showing processing corresponding to the operation of the operation unit 70. FIG. 6 is a flowchart showing processing executed when the [SET] button is pressed. FIGS. 7 and 8 are views showing the transition of the user interface (UI). FIG. 9 is a flowchart for explaining log read processing.

When the Transfer expansion program is executed, the initial window for Transfer processing, such as a UI window 701 shown in FIG. 7 or a UI window 801 shown in FIG. 8 appears. If a log file is present, a [Check Log] button is displayed, as shown in the UI window 801 of FIG. 8. When no log file to be confirmed is present because neither transmission nor printing has been performed, or log files have been deleted, the [Check Log] button is not displayed, as shown in the UI window 701 of FIG. 7. A title representing the current layer is displayed at the upper portion of the window.

Referring to FIG. 5, a key input is waited in step S1. When a key input is detected, it is determined in steps S2, S3, S4, and S5 whether the [MENU] button, [SET] button, [+] button, or [−] button of the operation unit 70 is operated. When the [MENU] button is pressed (YES in step S2), the immediately preceding window is displayed in step S6. When the [+] button is pressed (YES in step S4), the item selected from items displayed on the menu is switched to the next item in step S7. When the [−] button is pressed (YES in step S5), the selected item is switched to the preceding item in step S8. The flow returns to step S1 to wait for the next key input.

When the [SET] button is pressed (YES in step S3), it is determined in step S10 in FIG. 6 whether the Transfer menu is displayed. If YES in step S6, it is determined in steps S11, S12, and S13 whether a [Send] button for transmission, a [Setup Address] button for transmission setting, or the [Check log] button for confirming the transmission log is selected.

When the [Send] button is selected (YES in step S11), the Send menu is displayed in step S14, and the flow returns to step S1 in FIG. 5. When the [Setup Address] button is selected (YES in step S12), the Setup Address menu is displayed in step S15. When the [Check Log] button is selected (YES in step S13), the Check Log menu is displayed in step S16, and the flow returns to step S1 in FIG. 5.

When the Transfer menu is not displayed (NO in step S10), it is detected in steps S17, S18, and S19 whether the Send menu, Setup Address menu, or Check Log menu is displayed. When the Send menu is displayed (YES in step S17), image transmission processing is performed in step S20. When the Setup Address menu is displayed (YES in step S18), address setting processing is performed in step S21. When the Check Log menu is displayed (YES in step S19), log confirmation processing is performed in step S22, and the flow returns to step S1 in FIG. 5. If NO in step S19, a window of lower layer of one of the Send menu, Setup Address menu, and Check Log menu is being displayed. Hence, the flow advances to an appropriate one of the image transmission processing, address setting processing, and log confirmation processing.

Image transmission processing executed in step S20 will be described with reference to FIG. 7.

FIG. 7 is a view showing transition of the UI window in selecting an image to be transmitted. Referring to FIG. 7, the UI window 701 represents a state wherein Transfer as the above-described transmission program is started, and the initial window is displayed. In this state, when the [Send] button is selected, and the [SET] button is pressed, the window changes to a window representing a menu associated with transmission, as shown in a UI window 702 (step S17). When [Select Images] is selected from this menu, and the [SET] button is pressed, images to be transmitted can be selected/canceled in the multi-displayed images, as shown in a UI window 703. The images displayed at this time are reduced thumbnail images. In the first embodiment, a selected image has a check mark at its upper left portion. In the UI window 703, the left image on the upper side and the central image on the lower side have check marks at their upper left portions. These images have already been selected.

The order of the currently selected images is displayed at the upper right corner of the window, so the image transmission order can be easily recognized. In the UI window 703, "3" is displayed, so the third image to be transmitted is being selected.

The long bar displayed on the lower side of the window is a position bar representing the position of the selected image in all the images. This position bar is appropriately used as needed in another display mode as reference information representing the image currently selected from all the images.

"No. 3" on the lower side of the position bar is the picture number of the image (selected image) surrounded by the bold selection frame (The picture number is a unique number automatically added and changed in units of images. In the first embodiment, a picture number up to five digits can be used).

"[SET] Unmark" at the lower right of the window is a guidance display. In this example, since the upper left image with a check mark is surrounded by the selection frame in the UI window 703, "[SET] Unmark" is displayed. When an image having no check mark is surrounded by the selection frame, display changes to "[SET] Mark". This will be described in more detail. The selection frame is moved using the [+] and [−] buttons. When the image surrounded by the selection frame has no check mark, i.e., when the image is unselected, "[SET] Mark" is displayed. When the [SET] button is pressed, the "Mark" is set. The image surrounded by the selection frame is registered in the transmission mark file (Selimage.mrk), and a check mark is newly added to the upper left portion of the image. When a selected image, i.e., an image having a check mark is surrounded by the selection frame, "[SET] Unmark" is displayed. When the [SET] button is pressed, "Unmark" is set. The image surrounded by the selection frame is deleted from the mark file (Selimage.mrk), and the check mark at the upper left portion of the image is canceled.

The information and order of the selected images are held by the mark file (Selimage.mrk).

When the number of selected images exceeds 100, image selection is inhibited. "[Set]" Mark/Unmark" in the window is displayed in gray or at low contrast. When the number of selected images does not exceeds 100, and the mark file (Selimage.mrk) is fully filled with the information and order of the selected images, image selection is inhibited, and "[Set]" Mark/Unmark" in the window is displayed in gray or at low contrast. In this case, a message or an icon representing a shortage of capacity may be displayed in the column of guidance.

When transmission images are selected, the (MENU) button is pressed to end the operation, and the window returns to the UI window 702.

When [Clear Selection] is selected from the menu in the UI window 702, the information in the mark file (Selimage.mrk) is deleted after the intention of the user for deletion is confirmed. The information can be deleted at once in units of designated mark files.

An example will be described below in which the first and 10th images are set as transmission images in accordance with the format of the mark file Selimage.mrk. The Tag format according to the camera standard is as follows. For the descriptive convenience, <CR> represents carriage return.
<PRE><CR>
CIFF_VERSION=1.00<CR>
<IMG SRC=" . . . /CTG_0000/AUT_0001.jpg"><CR>
<IMG SRC=" . . . /CTG_0000/AUT_0010.jpg"><CR>

The first two lines of this tag represent the header. Whether the tag of each file of the mark file is correct is determined on the basis of the following check points.

The tag is started with < and ended with >.

A space is inserted between IMG and SRC. No other space is present.

The file name written at the portion between " and " in IMG SRC=" " specifies the file generated with the camera. More specifically, when a file is held in the directory structure shown in FIG. 4, (1) The file starts with . . . /CTG (directory holding the file generated by the camera).

(2) The file has . . . /CTG_0000/AUT_0001.jpg. CTG_0000 has eight characters. AUT_0001.jpg has 12 characters. More specifically, the 0000 portion of CTG_0000 is made up of numbers of 0 to 9, and the "_" portion of CTG_0000 has a space or a number from 1 to 9. In AUT_0001.jpg, "AUT" has 'a' to 'z' or a number from 0 to 9, the "_" portion has a space or a number from 0 to 9, the "0001" portion is made up of numbers of 0 to 9, and the "JPG" portion is jpg or crw.

(3) Equation (1) holds when A is the number represented by "_0000" of CTG_0000, and B is the number represented by "_0001" of AUT_0001.jpg. In equation (1), "50" is the number of files that can be held in one CTG directory.

$$A \times 50 < B \leq (A+1) \times 50 \qquad (1)$$

The tag format which is not based on the camera standard is as follows.
<PRE><CR>
CIFF_VERSION=1.00<CR>
PWRSHOT_MULTI_ENTRIES<CR>
<IMG SRC . . .

Since the tag PWRSHOT_MULTI_ENTRIES represents that the file has already been edited by the personal computer (PC), the camera must not edit this file. In this case, no complex analysis is necessary, unlike the above-described tag. <CR> is the carriage return code for MS-DOS of Microsoft. The carriage return code for Macintosh operating system of Apple is <LF> (Line Feed). In recording by the apparatus, <CR> is recorded. In reproduction, even when an <LF> code is given, the same operation as that for the <CR> code is performed.

By generating and storing a transmission log in a mark file format defined in CIFF (camera image file format) as described above, confirmation of transmission between a digital camera and a personal computer which received an image from the digital camera is easily performed.

When selection of transmission images is ended, transmission can be executed. Transmission destinations registered by address setting processing in step S21 of FIG. 6 are displayed, as shown in a UI window 705, and one of them can be selected. The address or telephone number of the transmission destination may be input at the time of transmission. During transmission, the transmission state is displayed as shown in a UI window 706. In this window, a [Cancel] button is displayed. When this button is pressed, transmission can be interrupted.

When transmission is ended, a log file with a mark file format is automatically generated independently of whether transmission is normally ended. When transmission is normally ended, the transmission mark file Selimage.mrk storing the image files to be transmitted and the transmission order is identical to the log file generated upon this image transmission. A file name complying with a predetermined rule is automatically given to the log file. In the directory structure shown in FIG. 4, the file name is ShowlogX.mrk. A number is given to "X" in the order of generation. The format of ShowlogX.mrk is the same as that of Selimage.mrk except that the object to be stored is a transmitted image.

Next, log confirmation processing after transmission, which is performed in step S22 of FIG. 6, will be described.

To confirm the log after transmission, [Check Log] is selected from the menu in the UI window 801 shown in FIG. 8, and [Start] is selected in a window 802. The log file name is displayed as shown in a UI window 803. Three mark files Showlog1, Showlog2, and Showlog3 can be managed, and images can be displayed for log confirmation in units of mark files.

When a log file to be browsed is selected in the menu 803, the first transmitted image is displayed. A UI window 804 shows a case wherein 30 images are transmitted by one communication cycle, and the 14th image is displayed. The numbers at the upper left corner of the window represent the total number of images and the number of the image which is being displayed, respectively. Normally, in a slide show where images are continuously displayed, the reproduction time or the presence/absence of repetition is set. In this example, the image is displayed to confirm the transmission log. Hence, an image registered in the log file is manually designated using the [+] and [−] buttons and displayed without automatic reproduction. When transmission fails, an error message is displayed in place of "End Sending" as shown in a UI window 707 of FIG. 7.

The log file is deleted by overwriting in the [Send] mode or selecting [Clear Log] from the menu in the UI window 802 shown in FIG. 8. When [Clear Log] is selected, the log file name is displayed, as in [Start]. The log file to be deleted is selected and deleted. Before deletion, a window for confirming deletion is displayed, as shown in a UI window 805.

The name of a log file can be changed. When [Name Log] is selected, the log file name is displayed as in [Start]. When a log file whose name is to be changed is selected, a UI window 806 is displayed. The log file names, log1 to log3 can be changed using a keyboard.

When [Show Info] is selected from the menu in the UI window 802, the simple transmission information stored in that log can be browsed as characters, as shown in a UI window 807. This information has a text format and is stored in the same file as the mark file of the transmission log at the time of transmission or a file associated with the mark file. Pieces of information which can be browsed are a total number of transmitted files, the total size of transmitted file, the transmission start time, and comments input in transmission. These are merely examples. Additionally, all data including the telephone number of the transmission destination, which can be stored in transmission, can be browsed.

FIG. 9 shows processing executed when one of items shown in the UI window 802 is designated.

First, in step S101, it is confirmed whether the number of mark files reaches the maximum number. The maximum number of mark files is a predetermined maximum number of files which can be held as mark files. If YES in step S101, end processing is performed in step S102. If NO in step S101, it is checked in step S103 whether an unprocessed mark file is present. When no file is present (NO in step S103), the processing is ended in step S102.

If it is determined in step S103 that an unprocessed mark file is present, it is determined in step S107 whether the header is appropriate (whether a header is present, and its format matches the standard). If the header is inappropriate, the mark file is regarded as a file generated by another device, and the flow returns to step S101.

Determination in step S107, which is done to determine whether the header is appropriate, and determination in step S111 (to be described later), which is performed to determine whether the IMG tag matches the standard format, are made by confirming the above check points. That is, a file that cannot be selected by the camera is determined and excluded from the objects to be selected. Files that have been edited by the PC and files whose contents have been changed by the user are excluded from the objects to be selected.

When the header is appropriate (YES in step S107), a count value cnt for counting the maximum number of transmitted images (in the first embodiment, the maximum number is 100) is reset to zero in step S109. It is checked in step S110 whether cnt<100. If NO in step S110, the flow returns to step S101.

If cnt<100, it is checked in step S111 whether the IMG tag is appropriate. If NO in step S111, the mark file is regarded as a file generated by another device, and the flow returns to step S101. If it is confirmed that the IMG tag matches the standard format, the flow advances to step S112 to increment the counter value cnt by one. It is determined in step S113 whether an IMG tag still remains. If YES in step S113, the flow returns to step S110. If NO in step S113, it is determined in step S114 that the mark file can be browsed. A flag representing the browse enable state is set, and the flow returns to step S101.

When processing is ended in step S102, the file name of the mark file having the flag representing the browse enabled state is displayed, as shown in the UI window 803 of FIG. 8.

When a mark file for printing is generated simultaneously with generation of mark files (log1 to log3) for displaying images for the transmission confirmation, the transmission log can be automatically printed. Because of the nature of automatic printing, basically, no operations are performed in printing procedures. Unlike display of an image on the display unit, a plurality of log files for printing are not stored.

For example, after transmission, a file Prt_log.mrk having a mark file format is automatically generated in the subdirectory of dc97¥misc¥ of CF card. The format is the same as that of the transmission log used to display an image on the display unit. The transmission start date/time or log itself may be stored in the text format as an associated file or the header of the mark file, and the text may be printed. At that time, as an alternative choice, a list of thumbnail images like INDEX print of an advanced photo system (APS) may be printed, or a normal image may be printed.

A transmitting-side apparatus has been described above. The present invention can also be applied to a case wherein an image is received by a digital camera having a communication function, and its reception log is confirmed.

The operation of the receiving-side apparatus in the system constructed by the transmission and reception apparatuses will be described below. In this example, the image sensing apparatus 100 such as a digital camera has a reception function.

Figure 10:
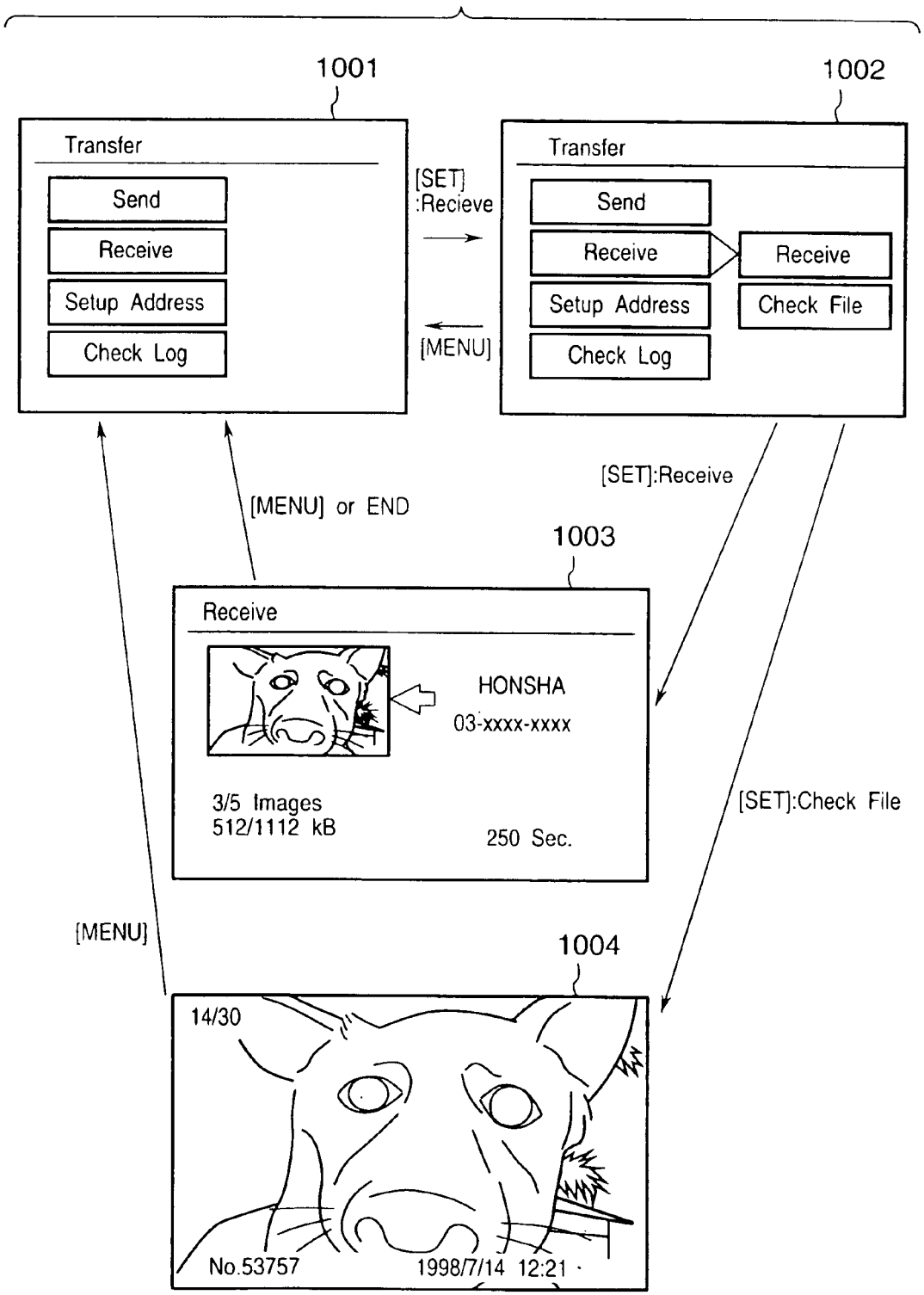
FIG. 10 is a view showing the transition of the UI window in reception log confirmation in the first embodiment of the present invention.

In the receiving-side apparatus, the Transfer initial window as shown in a UI window 1001 of FIG. 10 is displayed. In this window, [Receive] is selected, and the [SET] button of the image sensing apparatus is pressed. A submenu as shown in a UI window 1002 is displayed. When [Receive] is selected on this submenu, the reception stand-by state is set. When an image is transmitted from the transmitting-side apparatus, the image file can be received, and a window during reception as shown in a UI window 1003 is displayed. After reception, a file name is added to the image by a naming method unique to the reception apparatus, and the image file is stored. The receiving-side apparatus also automatically generates a mark file Receive.mrk for the reception confirmation. The file name of the image and the reception order are stored in this mark file. In this example, when a reception mark file is already present, the old reception mark file is overwritten. However, some reception mark files can be left by, e.g., changing the mark file names.

The format of the mark file Receive.mrk is the same as that of the mark file Selimage.mrk except that the object to be stored is a received image. The reception mark file stores the file name of the received image. However, the present invention is not limited to this, and any other information which can specify the received image can be stored. As information representing the order, an image on the receiving side, which is the same as that on the transmitting side, preferably has the same number as that on the transmitting side. In this case, a target image can be specified on both the transmitting and receiving sides by only specifying the number.

When [Check File] is selected on the submenu shown in the UI window 1002, the received image files can be continuously displayed by the slide show scheme in accordance with the mark file Receive.mrk, as shown in a UI window 1004. In this case, the image is switched using the [+] and [-] buttons. Display is ended by the [MENU] button, and the window returns to the initial window shown in the UI window 1001.

When the orders of transmission and reception of images stored in the mark file Receive.mrk generated at the time of reception and in the above-described log file ShowlogX.mrk generated at the time of transmission are used, the image files can be confirmed by only speech communication (voice) between the transmitting and receiving parties. This will be described below.

Mark files have serial numbers in the orders of transmission and reception and can be browsed in these orders. The numbers displayed at the upper left of the UI window 804 in FIG. 8 and the UI window 1004 shown in FIG. 10 are serial numbers. The transmission order is the same at the reception order. Hence, when numbers are sequentially assigned from the same number, the same number is automatically assigned to the same image file. Even when images have different file names on the transmitting and receiving sides, the same images can be easily specified by transmitting the serial numbers on both sides while viewing the images sequentially displayed.

In the above example, the images are confirmed by the slide show scheme. However, the present invention can be applied to all means using mark files, including automatic printing.

According to the above arrangement, a log file generated in transmission/reception is displayed or printed as an image, thereby easily confirming the contents of the log file. In addition, the transmitted file can be easily confirmed between the transmitting-side apparatus and the receiving-side apparatus.

The present invention is particularly effective for an apparatus having no large display unit, such as a digital camera or a portable terminal, or an apparatus for which complex image file processing is difficult. This is because when a transmitted/received image is to be confirmed, an apparatus having no large display unit cannot confirm an image by only character information. In addition, when characters are displayed together with an image, the characters can hardly be recognized. In an apparatus for which complex image file processing is difficult, the present invention is effective because the number of operations for specifying an image is small.

The present invention is also effective for an apparatus (e.g., a digital camera or a portable PC) which normally uses an internal CPU with insufficient calculation ability. As an example of transmission/reception management in use of a CPU having a high calculation ability, information representing the order can be stored in the header portion of an image file. In this case, to confirm the transmission/reception result, the header portions of all image files stored must be checked to specify the order. This operation has heavy calculation load on the apparatus. Hence, the CPU for performing processing must have a sufficiently high calculation ability. According to the present invention, however, the list representing the order of transmitted/received images is stored in a file difference from the image file, and the order can be easily specified by only checking the list. Hence, the calculation load can be reduced.

When a date and/or time is added to a file name of each image, and it is checked together with the file name, more appropriate transmission confirmation can be performed. Note that, since a mark file defined in CIFF is used in the first embodiment, the present invention is easily applied to apparatuses conforming to CIFF.

Second Embodiment

The second embodiment will be described below. In the second embodiment, processing executed when an error occurs during transmission of an image will be described.

Figure 11:
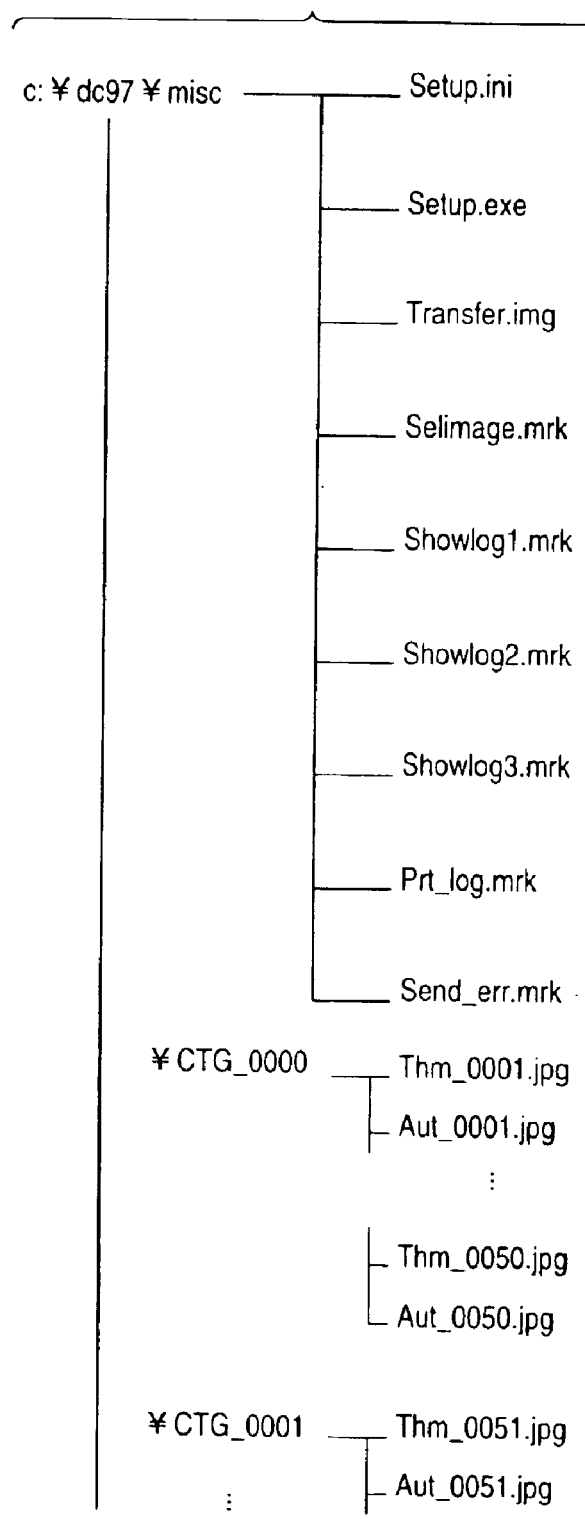
FIG. 11 is a view showing the directory structure of a second embodiment of the present invention.

FIG. 11 shows the directory structure of data recorded on a recording medium in the second embodiment. This is different from the directory structure shown in FIG. 4 in that a file Send_err.mrk is added in place of the file Receive.mrk. The file Send_err.mrk is generated when an image sensing apparatus 100 has failed to transmit an image.

The procedures until transmission are the same as those of the first embodiment. For a transmission failure, error processing (to be described later) is performed instead of displaying "End Sending" shown in the UI window 707 of FIG. 7.

When transmission is not normally ended due to some abnormality, the file path of a log file ShowlogX.mrk for a transmitted image and that of the mark file Selimage.mrk are compared to pick up an untransmitted file. For the untransmitted file, the above-described mark file Send_err.mrk is generated in the subdirectory of dc97¥misc¥ of CF card, like other mark files. The following applications are available.

Figure 12:
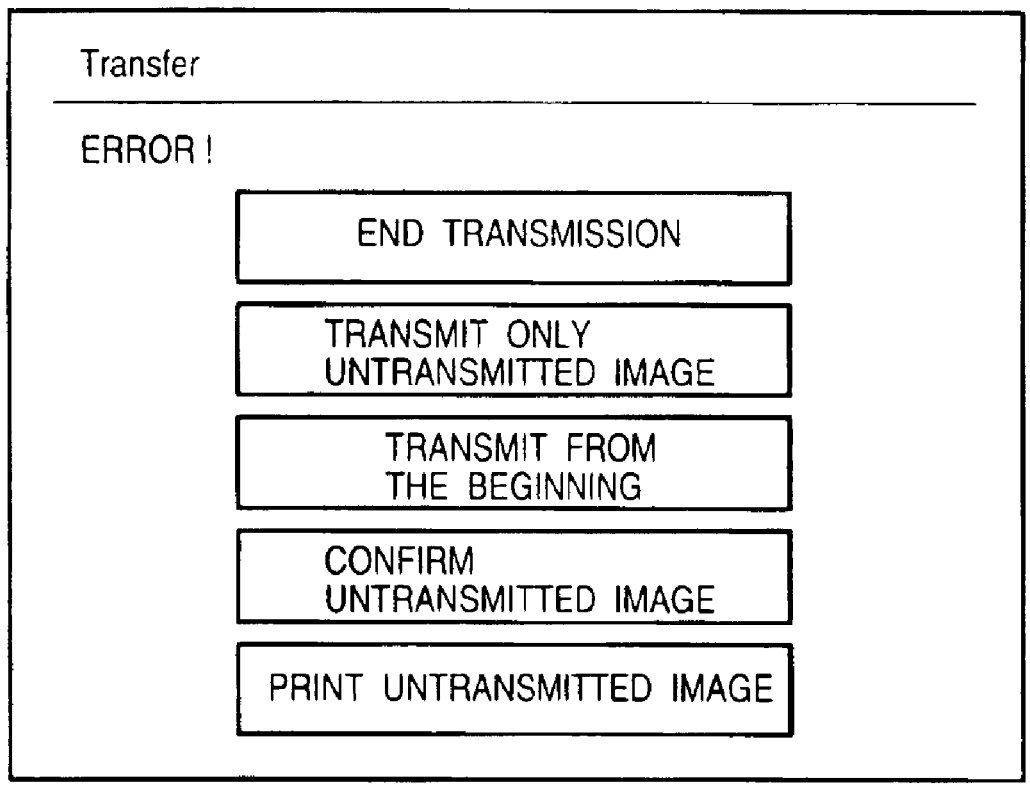
FIG. 12 is a view showing a UI window displayed when transmission is abnormally ended in the second embodiment of the present invention.

When file transmission is abnormally ended, an alarming buzzer is operated, and simultaneously, a window as shown in FIG. 12 is displayed on a display unit 28 of the camera. At this time, the log file ShowlogX.mrk and that of the mark file Selimage.mrk are compared in the camera, and the mark file Send_err.mrk is automatically generated.

The file Send_err.mrk has the same format as that of the mark file Selimage.mrk described in the first embodiment except the object to be stored is an image of a transmission failure.

An error of transmission of the 10th image, which is set in accordance with the format of the mark file Send_err.mrk, will be described. The tag format according to the camera standard is as follows. For the descriptive convenience, <CR> represents carriage return.
<PRE><CR>
CIFF_VERSION=1.00<CR>
<IMG SRC=" . . . /CTG_0000/AUT_0010.jpg"><CR>

The first two lines of this tag represent the header. Whether the tag of each file of the mark file is correct is determined on the basis of the same check points as those for the mark file Selimage.mrk described in the first embodiment, and a detailed description thereof will be omitted.

The tag format which is not based on the camera standard is as follows.
<PRE><CR>
CIFF_VERSION=1.00<CR>
PWRSHOT_MULTI_ENTRIES<CR>
<IMG SRC . . .

Since the tag PWRSHOT_MULTI_ENTRIES represents that the file has already been edited by the personal computer (PC), the camera need not edit this file. In this case, no complex analysis is necessary, unlike the above-described tag. <CR> is the carriage return code for MS-DOS of Microsoft. The carriage return code for Macintosh operating system of Apple is <LF> (Line Feed). In recording by the apparatus, <CR> is recorded. In reproduction, even when an <LF> code is given, the same operation as that for the <CR> code is performed.

By generating and storing the file Send_err.mrk in a mark file format defined in CIFF (camera image file format) as described above, confirmation of transmission between a digital camera and a personal computer which received an image from the digital camera is easily performed.

Figure 13A:
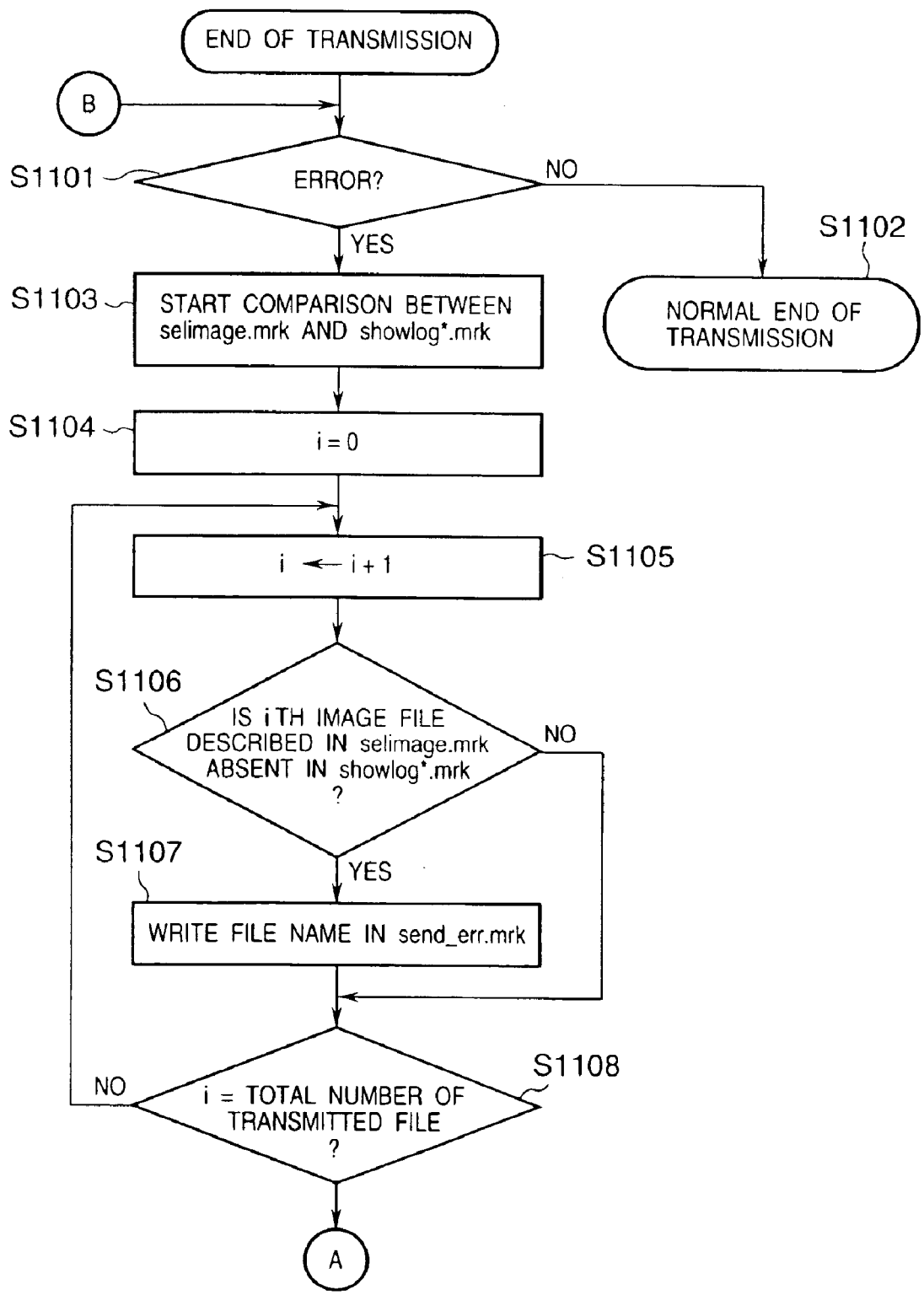
FIGS. 13A and 13B are flowcharts for explaining processing when transmission is abnormally ended in the second embodiment of the present invention.
Figure 13B:
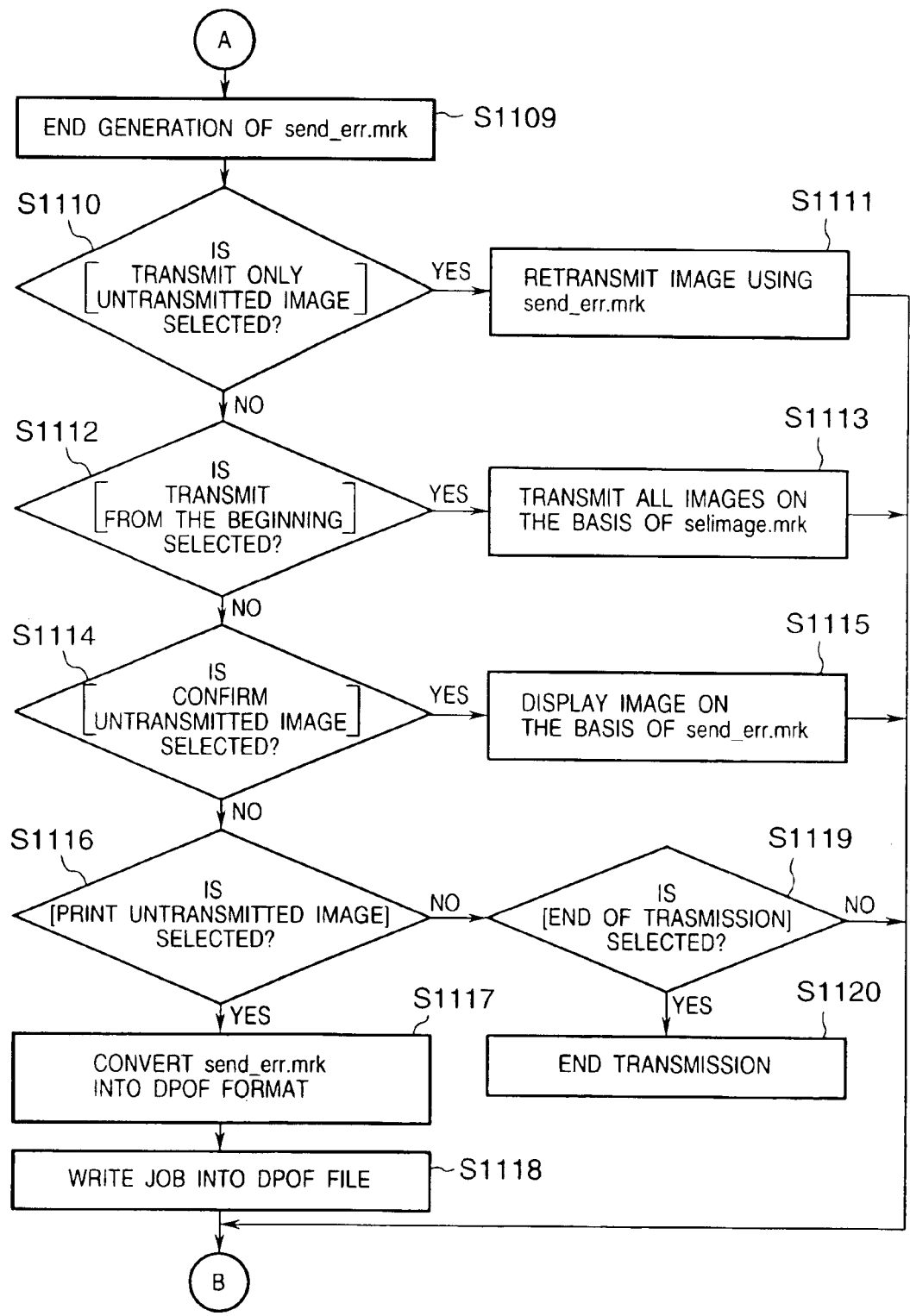

Processing executed when an error has occurred during image transmission, and the UI window shown in FIG. 12 is being displayed will be described next with reference to the flowcharts in FIGS. 13A and 13B.

When image transmission is ended, it is determined in step S1101 whether it is ended with an error or normally ended. When image transmission is normally ended (NO in step S1101), processing is ended in step S1102. If the end results in an error, comparison between image file names described in the files Selimage.mrk and ShowlogX.mrk is started in step S1103. In step S1104, a counter i is initialized to 0. In step S1105, the counter value is incremented by one. In step S1106, it is confirmed whether the file name of an i-th image to be transmitted, which is described in the file Selimage.mrk, is also described in the file ShowlogX.mrk.

If the image file name is not described, it is determined that the i-th image is not transmitted. In step S1107, the image file name is described in the mark file Send_err.mrk, and the flow advances to step S1108. If the image file name is described, it is determined that the i-th image is transmitted, and the flow advances to step S1108.

In step S1108, the counter value i is compared with the number of image files to be transmitted to determine whether all image files described in the mark file Selimage.mrk have been compared. If comparison of all image files is not ended, the flow returns to step S1105 to increment the counter i by one. The operation in steps S1106 to S1108 is repeated until all image files described in the file Selimage.mrk are compared.

When comparison of all image files is ended (YES in step S1108), Send_err.mrk generation processing is ended in step S1109.

The file names of all untransmitted image files are described in the generated file Send_err.mrk. Processing for the untransmitted images can be performed using this file.

In step S1110, it is determined whether "transmit only untransmitted image" is selected from the menu of the UI window shown in FIG. 12. In the second embodiment, if YES in step S1110, the untransmitted image is selected and transmitted using the file Send_err.mrk in step S1111, unlike normal image transmission in which an image is transmitted on the basis of the file Selimage.mrk. When transmission is ended, it is determined in step S1101 again whether the end is normal or results in an error. If YES in step S1101, the above processing is repeated.

When "transmit from the beginning" is selected in step S1112, all images are transmitted on the basis of the mark file Selimage.mrk in step S1113 as in normal image transmission. When transmission is ended, it is determined in step S1101 again whether the end results in an error. If YES in step S1101, the above processing is repeated.

When "confirm untransmitted image" is selected in step S1114, the untransmitted image is displayed on the image display unit 28 of the camera in step S1115.

When "print untransmitted image" is selected in step S1116, the image file information in the file Send_err.mrk is converted into a format adapted to a known DPOF (Digital Print Order Format) format (step S1117) and recorded in a memory card for storing an image as one of jobs in the DPOF file in step S1118. When the user inserts this memory card into a direct printer or the like, the untransmitted image can be easily printed.

In this case, default setting can be used for conditions (e.g., standard print or index print) other than image designation information. Alternatively, various conditions may be set.

When the untransmitted image is to be recorded as one of jobs in the DPOF file, a mark representing that the job is an untransmitted image print job or a special name is added. When the user selects this job in printing, only the untransmitted image can be printed even when another job is described in the DPOF file.

Instead of generating a job, a new DPOF file may be generated.

When "end of transmission" is selected in step S1119, transmission processing is ended in step S1120.

As described above, according to the second embodiment, when an error occurs during image transmission, the list of images to be transmitted is compared with the list of transmitted images, and a list representing information of untransmitted images is generated. Desired processing after the image transmission error can be efficiently executed using this untransmitted image list.

When a date and/or time is added to a file name of each image, and it is checked together with the file name, more appropriate transmission confirmation can be performed.

The number of directories that can be generated or the number of image files that can be stored is not limited to that of the above embodiments and can be appropriately changed in accordance with the characteristics of the image sensing apparatus or a recording medium such as a CF card.

In the above embodiments, a mark file format defined in CIFF is used; however, the present invention is not limited to this, and a file format defined in, e.g., Design rule for Camera File system (DCF) may be used. It is convenient to use a standardized format since image sensing apparatuses of the above embodiments become compatible with other apparatuses.

The present invention can be applied to a system constituted by a plurality of devices (e.g., host computer, camera head, CF card) or to an apparatus comprising a single device (e.g., digital camera, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments are realized by executing the program codes which are read by a computer, the present invention includes a case where an OS (operating system) or the like working on the computer performs a part or the entire processes in accordance with designations of the program codes and realize functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. An image communication method for use by an image transmitting apparatus comprising:

a transmission step of automatically transmitting a plurality of image files indicated in a transmission image designation file to an external device;

a first list generation step wherein said image transmitting apparatus generates a list holding information indicative of the transmitted image files and information representing a transmission order of the image files transmitted in said transmission step, the list being named a file name different from that of the transmission image designation file and having a same format as that of the transmission image designation file; and an output step of outputting the transmitted image files and the transmission order to an output device on the basis of the information held in the list.

2. The method to claim 1 further comprising a storage step of storing image files, and a selection step of selecting, from the image files stored in the storage step, a plurality of image files to be transmitted and a transmission order of the selected image files, wherein, in said transmission step, the image files selected in said selection step are transmitted in the selected transmission order.

3. The method according to claim 2 further comprising a second list generation step of generating the transmission image designation file holding information representing the image files and the transmission order selected in the selection step, wherein, in said transmission step, the image files are transmitted on the basis of the transmission image designation file generated in said second list generation step, and in said first list generation step, the list is generated on the basis of the transmission image designation file referred to in said transmission step.

4. The method according to claim 3, wherein, when at least a part of the image files corresponding to the image information held in the transmission image designation file generated in said second list generation step is not transmitted, in said first list generation step, information indicating that failure of transmission has occurred is outputted.

5. The method according to claim 1, wherein the information indicative of an image file is the file name of the image.

6. The method according to claim 1, wherein, in said output step, the transmitted image files are automatically outputted in the transmission order.

7. The method according to claim 1, wherein said output device is a display device.

8. The method according to claim 1, wherein said output device is a printing device.

9. The method to claim 1 further comprising an image sensing step of sensing an image of an object to acquire an image file.

10. The method according to claim 1, wherein, in said first list generation step, the list is generated in accordance with a mark file format defined in CIFF.

11. The method according to claim 3, wherein, in said second list generation step, the list is generated in accordance with a mark file format defined in CIFF.

12. An image communication apparatus comprising:

transmission means for automatically transmitting a plurality of image files indicated in a transmission image designation file to an external device;

first list generation means for generating a list holding information indicative of the transmitted image files and information representing a transmission order of the image files transmitted in said transmission step, the list being named a file name different from that of the transmission image designation file and having a same format as that of the transmission image designation file; and control means for outputting the transmitted image files and the transmission order to output means on the basis of the information held in the list.

13. The apparatus according to claim 12 further comprising storage means capable of storing a plurality of image files, and selection means for selecting, from the image files stored in said storage means, a plurality of image files to be transmitted and a transmission order of the selected image files, wherein said transmission means transmits the image files selected by said selection means in the selected transmission order.

14. The apparatus according to claim 13 further comprising second list generation means for generating the transmission image designation file holding information representing the image files and the transmission order selected by said section means, wherein said transmission means transmits the image files on the basis of the transmission image designation file generated by said second list generation means, and after image transmission by said transmission means, said first list generation means generates the list on the basis of the transmission image designation file referred to by said transmission means.

15. The apparatus according to claim 14, herein when at least a part of the image files corresponding to the image information held in the transmission image designation file generated by said second list generation means is not transmitted, information indicating that failure of transmission has occurred is outputted.

16. The apparatus according to claim 12, wherein the information indicative of an image file is the file name of the image.

17. The apparatus according to claim 12, herein said control means automatically outputs the transmitted image files in the transmission order.

18. The apparatus according to claim 12, wherein said output means is display means.

19. The apparatus according to claim 12, wherein said output means is a printing device.

20. The apparatus according to claim 12 further comprising image sensing means for sensing an image of an object to acquire an image file.

21. The apparatus according to claim 12, wherein said first list generation means generates the list in accordance with a mark file format defined in CIFF.

22. The apparatus according to claim 14, wherein said second list generation means generates the list in accordance with a mark file format defined in CIFF.

23. A computer program product comprising a computer usable medium having computer readable program code means embodied in said medium for an image communication method for use by an image transmitting apparatus, said product comprising:

first computer readable program code means for automatically transmitting a plurality of image files indicated in a transmission image designation file to an external device;

second computer readable program code means for causing said image transmitting apparatus to generate a list holding information indicative of the transmitted image files and information representing a transmission order of the image files transmitted in said transmission step, the list being named a file name different from that of the transmission image designation file and having a same format as that of the transmission image designation file; and third computer readable program code means for outputting the transmitted image files and the transmission order to an output device on the basis of the information held in the list.

* * * * *

UNITED STATES PATENT AND TRADEMARK OFFICE
CERTIFICATE OF CORRECTION

PATENT NO.        : 6,954,280 B1                                Page 1 of 1
APPLICATION NO.   : 09/415668
DATED             : October 11, 2005
INVENTOR(S)       : Hiroshi Kaibara It is certified that error appears in the above-identified patent and that said Letters Patent is hereby corrected as shown below:

ON THE COVER PAGE:

At Item (73) Assignee: please delete "Canon Kabushika Kaisha, Tokyo (JP) and insert --Canon Kabushiki Kaisha (Tokyo, JP) --

Signed and Sealed this

Fifteenth Day of August, 2006

JON W. DUDAS
*Director of the United States Patent and Trademark Office*